UNITED STATES PATENT OFFICE.

EDWARD C. HAZARD, OF SHREWSBURY, NEW JERSEY.

PREPARING CELERY-SALT.

SPECIFICATION forming part of Letters Patent No. 331,134, dated November 24, 1885.

Application filed June 29, 1885. Serial No. 170,177. (No specimens.)

*To all whom it may concern:*

Be it known that I, EDWARD C. HAZARD, a citizen of the United States, residing at Shrewsbury, in the county of Monmouth and State of New Jersey, have invented a certain new, useful, and Improved Celery-Salt Condiment and Process of Making the Same, of which the following is a full, clear, and exact description.

This invention relates to a certain new, useful, and improved process of making celery-salt condiment.

Common salt mixed more or less intimately with ground celery-seed has long been in use as a condiment to be used either in cooking, or directly as a flavoring material upon the article to be eaten. Such preparation contains the whole of the ground celery-seed, its hull, chaff, and other impurities, so that it not only presents a disagreeable appearance, being dark in color, but does not last well, soon turning sour, imparting a bad flavor to any article to which it is applied, and even being probably deleterious to health. Moreover, the salt with which it is mixed tends to become clogged and lumpy, so as to need stirring or breaking up before use. My improved process produces a condiment which is a pure celery-salt, is free from these imperfections, is lasting in its good properties, does not clog or become lumpy, and is of the finest flavor.

In practicing my invention I proced as follows: About six pounds of coarsely-ground white celery-seed are packed in a percolator and moistened with about thirty fluid ounces of strong alcohol. This is preferably left to stand for one or two days. Using the above quantities the alcohol will not run through, but will be absorbed by the seed. The percolator should be covered and closed as completely as possible during this period. Next it is to be slowly percolated with about one and one half gallon of strong alcohol, which afterward is filtered through animal charcoal, preferably as it issues from the percolator. This removes the impurities such as impair the keeping qualities of the extract. This extract, which under ordinary conditions will amount to one gallon, is added to about thirty pounds of fine salt, which may with advantage have previously been roasted, mixed with about ten pounds of rice-flour. By standing after thorough mixture the alcohol evaporates, leaving a dry fine salt thoroughly impregnated with the flavor of celery.

By my invention I produce a celery-salt of very fine quality, pure white in color, free from impurities, and which retains its flavor and does not become rancid or sour in use.

I do not intend to limit myself to the exact proportions named, as it is obvious that these might be somewhat varied without materially altering the result obtained.

What I claim as my invention, and desire to secure by Letters Patent, is—

1. The process of making a celery-salt condiment, comprising the formation of an alcoholic extract of celery, filtering the same, mixing with it a compound of salt and dry flour, and finally evaporating the mixture to dryness, substantially as described.

2. The process of making a celery-salt condiment, comprising the formation of an alcoholic extract of celery, filtering the same, mixing it with a compound of salt and of rice-flour previously impregnated with celery, and finally evaporating the mixture, substantially as described.

In testimony whereof I have hereunto set my hand this 27th day of June, A. D. 1885.

EDWARD C. HAZARD.

Witnesses:
JOHN J. BLAUSETT,
ARTHUR C. WEBB.